(12) United States Patent
Goyal et al.

(10) Patent No.: US 9,967,148 B2
(45) Date of Patent: May 8, 2018

(54) METHODS, SYSTEMS, AND COMPUTER READABLE MEDIA FOR SELECTIVE DIAMETER TOPOLOGY HIDING

(71) Applicant: Oracle International Corporation, Redwood Shores, CA (US)

(72) Inventors: Pankaj Goyal, Cary, NC (US); Jonathan James Palmer, Durham, NC (US); Donald Eugene Wallace, Boulder, CO (US); Steven Robert Donovan, Dallas, TX (US); Rajat Budhiraja, Faridabad (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 335 days.

(21) Appl. No.: 14/795,601

(22) Filed: Jul. 9, 2015

(65) Prior Publication Data

US 2017/0012824 A1    Jan. 12, 2017

(51) Int. Cl.
*H04L 12/24* (2006.01)
*H04L 12/751* (2013.01)
*H04L 12/725* (2013.01)

(52) U.S. Cl.
CPC ............ *H04L 41/12* (2013.01); *H04L 45/304* (2013.01); *H04L 45/02* (2013.01)

(58) Field of Classification Search
CPC ........ H04L 41/12; H04L 45/304; H04L 45/02
See application file for complete search history.

(56) References Cited

U.S. PATENT DOCUMENTS

| | | |
|---|---|---|
| 5,835,087 A | 11/1998 | Herz et al. |
| 6,185,612 B1 | 2/2001 | Jensen et al. |

(Continued)

FOREIGN PATENT DOCUMENTS

| | | |
|---|---|---|
| CN | 1964316 | 5/2007 |
| CN | 103039049 B | 8/2016 |

(Continued)

OTHER PUBLICATIONS

Notification of the Second Office Action for Chinese Application No. 201180032307.4 (dated Jul. 17, 2015).

(Continued)

*Primary Examiner* — Gbemileke J Onamuti
(74) *Attorney, Agent, or Firm* — Jenkins, Wilson, Taylor & Hunt, P.A.

(57) ABSTRACT

The subject matter described herein includes systems, methods, and computer readable media for selective Diameter topology hiding. The system includes a Diameter agent including a network interface configured to receive, from a first Diameter node in a first service provider network, a first Diameter signaling message including Diameter topology information and a Diameter topology hiding module (THM). In some aspects, the THM is configured to determine a trust relationship between the first service provider network and a second service provider network to which the first Diameter signaling message is addressed, in response to determining that the trust relationship requires at least some level of topology hiding, determine a topology hiding type based on the first Diameter signaling message, and modify, based on the topology hiding type, the Diameter topology information included in the first Diameter signaling message to hide at least some of the Diameter topology information.

20 Claims, 7 Drawing Sheets

(56) References Cited

U.S. PATENT DOCUMENTS

| | | |
|---|---|---|
| 7,266,837 B2 | 9/2007 | Monjas-Llorente et al. |
| 8,127,016 B2 | 2/2012 | Westman et al. |
| 8,171,032 B2 | 5/2012 | Herz |
| 8,218,459 B1* | 7/2012 | Stucker ............... H04L 63/0407 370/261 |
| 8,218,490 B2 | 7/2012 | Rydnell et al. |
| 8,626,157 B2 | 1/2014 | Nas et al. |
| 8,929,360 B2 | 1/2015 | Agarwal et al. |
| 9,094,819 B2 | 7/2015 | McCann et al. |
| 9,253,163 B2 | 2/2016 | Donovan |
| 2003/0227894 A1 | 12/2003 | Wang et al. |
| 2005/0235000 A1 | 10/2005 | Keil |
| 2006/0155871 A1 | 7/2006 | Ilkka et al. |
| 2006/0259759 A1 | 11/2006 | Maino et al. |
| 2007/0250642 A1* | 10/2007 | Thubert ............ H04L 29/12915 709/245 |
| 2008/0010669 A1 | 1/2008 | Aittola et al. |
| 2009/0080440 A1 | 3/2009 | Balyan et al. |
| 2009/0165017 A1 | 6/2009 | Syed et al. |
| 2009/0313379 A1 | 12/2009 | Rydnell et al. |
| 2011/0165901 A1 | 7/2011 | Baniel et al. |
| 2011/0195710 A1 | 8/2011 | Nas et al. |
| 2011/0302244 A1 | 12/2011 | McCann et al. |
| 2012/0155389 A1 | 6/2012 | McNamee et al. |
| 2012/0157047 A1 | 6/2012 | Chen et al. |
| 2012/0158994 A1 | 6/2012 | McNamee et al. |
| 2012/0226814 A1 | 9/2012 | Stucker |
| 2013/0097418 A1 | 4/2013 | Bhatt et al. |
| 2013/0151845 A1 | 6/2013 | Donovan |
| 2013/0290722 A1 | 10/2013 | Kall et al. |
| 2016/0352696 A1 | 12/2016 | Essigmann et al. |
| 2017/0214691 A1 | 7/2017 | McCann |

FOREIGN PATENT DOCUMENTS

| | | |
|---|---|---|
| EP | 1 848 150 A1 | 10/2007 |
| EP | 1 873 980 A1 | 1/2008 |
| KR | 10-1506232 | 3/2015 |
| WO | WO 2007/125498 A1 | 11/2007 |
| WO | WO 2011/100166 A2 | 8/2011 |
| WO | WO 2011/156274 A2 | 12/2011 |

OTHER PUBLICATIONS

Non-Final Office Action for U.S. Appl. No. 13/712,481 (dated Apr. 29, 2015).
Notice of Allowance and Fee(s) Due for U.S. Appl. No. 13/154,119 (dated Mar. 17, 2015).
Advisory Action Before the Filing of an Appeal Brief for U.S. Appl. No. 13/712,481 (dated Mar. 11, 2015).
Email Regarding Decision to Grant for Korean Patent Application No. 2012-7034449 (dated Mar. 2, 2015).
Office Action for Korean Patent Application No. 2012-7034449 (dated Oct. 14, 2014).
Notification of the First Office Action for Chinese Patent Application No. 201180032307.4 (dated Nov. 4, 2014).
Final Office Action for U.S. Appl. No. 13/712,481 (dated Dec. 3, 2014).
Non-Final Office Action for U.S. Appl. No. 13/712,481 (dated May 8, 2014).
Notice of Preliminary Rejection for Korean Patent Application No. 2012-7034449 (dated Apr. 25, 2014).
Advisory Action Before the Filing of an Appeal Brief for U.S. Appl. No. 13/154,119 (dated Jan. 22, 2014).
Final Office Action for U.S. Appl. No. 13/154,119 (dated Oct. 25, 2013).
Notice of Allowance and Fee(s) Due for U.S. Appl. No. 13/021,402 (dated Sep. 9, 2013).
Non-Final Office Action for U.S. Appl. No. 13/154,119 (dated May 2, 2013).
Communication of European publication number and information on the application of Article 67(3) EPC for European Patent Application No. 11792956.2 (dated Mar. 13, 2013).
Non-Final Office Action for U.S. Appl. No. 13/021,402 (dated Nov. 8, 2012).
Notification of Transmittal of the International Search Report and the Written Opinion of the International Searching Authority, or the Declaration for International Application No. PCT/US2011/039285 (dated Feb. 9, 2012).
Notification of Transmittal of the International Search Report and the Written Opinion of the International Searching Authority, or the Declaration for International Application No. PCT/US2011/023752 (dated Oct. 26, 2011).
"3rd Generation Partnership Project; Technical Specification Group Core Network and Terminals; Evolved Packet System (EPS); Mobility Management Entity (MME) and Serving GPRS Support Node (SGSN) related interfaces based on Diameter protocol (Release 10)," 3GPP TS 29.272, V102.0, pp. 1-95 (Mar. 2011).
3GPP, "3rd Generation Partnership Project; Technical Specification Group Core Network and Terminals; InterWorking Function (IWF) Between MAP Based and Diameter Based Interfaces (Release 9)," 3GPP TS 29.305 V9.0.0, pp. 1-63 (Dec. 2009).
Rouse, "Platform," http://searchservervirtualization.techtarget.com/definition/platform, pp. 1-2 (2006-2009).
Calhoun et al., "Diameter Base Protocol," RFC 3588, pp. 1-147 (Sep. 2003).
Calhoun et al., "Diameter Base Protocol,"draft-ietf-aaa-diameter-07, Section 6.3, p. 68 (Jul. 2001).
Calhoun et al., "Diameter Base Protocol," the Internet Society, pp. 1-64 (Mar. 2001).
Faragó et al., "Virtual Path Network Topology Optimization Using Random Graphs," INFOCOM '99, Eighteenth Annual Joint Conference of the IEEE Computer and Communications Societies, vol. 2, pp. 491-496 (Mar. 21-25, 1999).
Goldschlag et al., "Hiding Routing Information," Information Hiding Lecture Notes in Computer Science, First International Workshop, vol. 1174, pp. 137-150 (May 30-Jun. 1, 1996).
"RADIUS," https://en.wikipedia.org/wiki/RADIUS#Accounting, pp. 1-17 (Nov. 27, 2015).
Notice of Allowance for U.S. Appl. No. 13/712,481 dated Oct. 20, 2015.
Notice of Allowance for U.S. Appl. No. 13/712,481 dated Sep. 25, 2015.
Notice of Allowance for U.S. Appl. No. 13/154,119 dated Apr. 16, 2015.
"EliteDSC—LTE Roaming," http://www.elitecore.com/telecompractices/lteroaming.html, pp. 1-2 (Copyright 2013).
"Topology Hiding," Chapter 13, Cisco Unified Border Element (SP Edition) Configuration Guide: Distributed Model, pp. 13-1-13-10 (Mar. 29, 2011).
Chiba et al., "Dynamic Authorization Extensions to Remote Authentication Dial in User Service (RADIUS)," RFC 5176, pp. 1-31 (Jan. 2008).
"Features—Kamailio (OpenSER) SIP Server," http://www.kamailio.org/w/features/, pp. 1-3 (Copyright 2008-2015).
Rigney et al., "RADIUS Accounting," RFC 2866, pp. 1-28 (Jun. 2000).
Rigney et al., "Remote Authentication Dial in User Service (RADIUS)." RFC 2865, pp. 1-68 (Jun. 2000).
Notification of the Third Office Action for Chinese Application No. 201180032307.4 (Jan. 25, 2016).
Notification to grant a Chinese patent for Chinese Patent Application No. ZL201180032307.4 (dated Jun. 23, 2016).
Extended European Search Report for European Application No. 11792956.2 (Feb. 8, 2016).
Non-Final Office Action for U.S. Appl. No. 15/003,647 (dated Oct. 10, 2017).

* cited by examiner

| PROTECTED NETWORK | RELATIONSHIP WITH DESTINATION NETWORK ||||
|---|---|---|---|---|
| | N1 | N2 | N3 | N4 |
| N1 | TRUSTED | NON-TRUSTED | TRUSTED | NON-TRUSTED |
| N2 | NON-TRUSTED | TRUSTED | TRUSTED | TRUSTED |
| N3 | NON-TRUSTED | TRUSTED | TRUSTED | NON-TRUSTED |
| N4 | TRUSTED | TRUSTED | TRUSTED | TRUSTED |

FIGURE 3A

| PROTECTED NETWORK | NETWORK NODE (HOST) ||||
|---|---|---|---|---|
| | MME | HSS | PCRF | AF |
| N1 | NONE | HSS DB1 | PCRF DB1 | NONE |
| N2 | MME DB1 | NONE | NONE | NONE |
| N3 | NONE | HSS DB2 | NONE | NONE |
| N4 | NONE | NONE | NONE | NONE |

METHODS, SYSTEMS, AND COMPUTER READABLE MEDIA FOR SELECTIVE DIAMETER TOPOLOGY HIDING

TECHNICAL FIELD

The subject matter described herein relates to methods and systems for communications in a Diameter network. More particularly, the subject matter described herein relates to methods, systems, and computer readable media for selective Diameter topology hiding.

BACKGROUND

In Diameter networks, Diameter signaling messages carry sensitive information such as addresses of entities from a Diameter network thus revealing Diameter topology information. For example, when a Diameter request message is sent from a node in a first operator's network and is routed to the appropriate destination node (e.g., a server) in a second operator's network, without some form of topology hiding, the Diameter request message includes information identifying the origin node in the first operator's network. Similarly, when the server in the second operator's network sends an answer to the request message, without topology hiding, the answer identifies the origin node in the second operator's network. Depending on the level of trust between the first and second networks, it may be desirable to implement topology hiding.

However, one problem in implementing topology hiding is that Diameter information is needed to transmit and route Diameter signaling messages that are responsive to received Diameter signaling messages. For example, if a Diameter node receives a request message, the Diameter node may use an origin host parameter in the message to formulate an answer to the request message. If the origin host is hidden or replaced by the originating network, the receiving node may not be able to respond correctly to the request message.

Another problem with implementing topology hiding is that topology hiding needs to be flexible. That is, topology hiding may be implemented differently depending on the level of trust between networks. For example, a trusted service provider may receive actual topology information from a network other than an untrusted service provider. A one-size-fits-all topology hiding solution eliminates the ability to be flexible in network topology application.

Still another problem with implementing topology hiding includes the ability to deal with stateless and stateful transactions. For stateless transactions, a Diameter signaling router should be able to examine a message and determine, based on parameters in the message, where the message should be routed. If the topology information in the message is hidden, routing may not be possible. Similarly, for stateful transactions, the receiving node needs to examine parameters in the message and stored state information to determine where to route the message. If topology information is hidden, stateful transaction routing may not be possible.

Accordingly, in light of these disadvantages associated with the inclusion of node identifying information in Diameter signaling messages, there exists a need for methods, systems, and computer readable media for selective Diameter topology hiding.

SUMMARY

The subject matter described herein includes systems, methods, and computer readable media for selective Diameter topology hiding. In some aspects, a system for selective Diameter topology hiding can include a Diameter agent including a network interface configured to receive, from a first Diameter node in a first service provider network, a first Diameter signaling message including Diameter topology information and a Diameter topology hiding module (THM). In some aspects, the THM is configured to determine a trust relationship between the first (i.e., originating) service provider network and a second (i.e., destination) service provider network to which the first Diameter signaling message is addressed, in response to determining that the trust relationship requires at least some level of topology hiding, determine a topology hiding type based on the first Diameter signaling message, and modify, based on the topology hiding type, the Diameter topology information included in the first Diameter signaling message to hide at least some of the Diameter topology information.

In some aspects, a method for selective Diameter topology hiding can be performed at a Diameter agent including a Diameter topology hiding module (THM). The method can include receiving, from a first Diameter node in a first service provider network, a first Diameter signaling message that including Diameter topology information, determining a trust relationship between the first service provider network and a second service provider network to which the first Diameter signaling message is addressed, in response to determining that the trust relationship requires at least some level of topology hiding, determining a topology hiding type based on the first Diameter signaling message, and modifying, based on the topology hiding type, the Diameter topology information included in the first Diameter signaling message to hide at least some of the Diameter topology information.

The subject matter described herein may be implemented in hardware, software, firmware, or any combination thereof. As such, the terms "function" "node" or "module" as used herein refer to hardware, which may also include software and/or firmware components, for implementing the feature being described. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings, wherein like reference numerals represent like parts, of which.

DETAILED DESCRIPTION

In accordance with the subject matter disclosed herein, methods, systems, and computer readable media are provided for selective Diameter topology hiding. Reference will now be made in detail to exemplary embodiments of the subject matter described herein, examples of which are illustrated in the accompanying drawings. Wherever possible, the same reference numbers will be used throughout the drawings to refer to the same or like parts. The present subject matter utilizes a Diameter agent, such as a Diameter signaling router (DSR) or Diameter relay agent, which is configured to reside in the core of a wireless communications network. The multi-network service provider environment may include at least two communications networks, such as, for example, long term evolution (LTE) networks, an Internet protocol multimedia subscriber (IMS) networks, or any other networks adapted to utilize the Diameter protocol and to facilitate communication between Diameter based agents, clients, servers, proxies, routers, and nodes.

Figure 1:
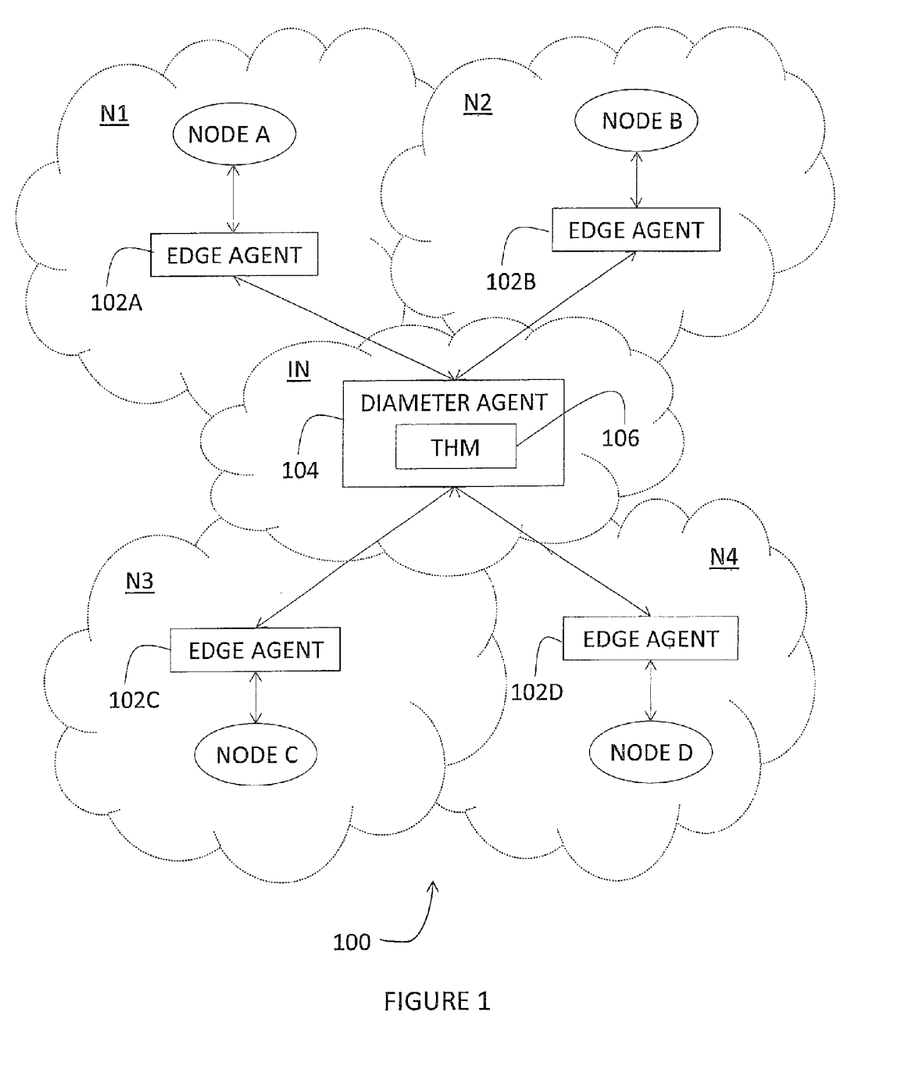
FIG. 1 is a block diagram illustrating an exemplary long term evolution (LTE) multi-network service provider environment utilizing a topology hiding module (THM) of a Diameter agent according to an embodiment of the subject matter described herein.

As described herein, "Diameter signaling messages" may comprise signaling messages used in session based applications such as, for example, S9/Rx, which comprises Credit-Control-Request (CCR) messages, Credit-Control-Answer (CCA) messages, Accounting-Request (ACR) messages, Accounting-Answer (ACA) messages, Re-Auth-Request (RAR) messages, Re-Auth-Answer (RAA) messages, Location Information Request (LIR) messages, Location Information Answer (LIA) messages, and the like, as well as signaling messages used in session-less applications, such as, for example, S6a/S6d, which comprises Update Location Request (ULR) messages, Update Location Answer (ULA) messages, Cancel Location Request (CLR) messages, Cancel Location Answer (CLA) messages, and the like. As described herein a "node" may comprise any network entity located in a wireless communications network that is configured with a host address used to identify network hosts. FIG. 1 is a block diagram illustrating an exemplary LTE multi-network service provider environment including a Diameter agent according to an embodiment of the subject matter described herein. In FIG. 1, an LTE multi-network service provider environment 100 comprising four LTE network service providers N1-N4 is provided. Notably, LTE multi-network service provider environment 100 may comprise more or less network service providers than that illustrated in FIG. 1. LTE network service providers N1-N4 may be configured as peer networks that are each serviced by a core network. In some embodiments, the core network may comprise an intermediate network IN configured as an interworking network using gateways to route information packets or messages between networks N1-N4.

Each of provider networks N1-N4 may need to protect or hide sensitive information in messages exchanged between provider networks N1-N4. In some embodiments, the sensitive information may comprise Diameter node topology and/or node identification information. Diameter topology information may include any Diameter level parameter that is usable to identify a service provider's network topology. For example, Diameter topology information may include Diameter hostnames or even mapped hostname information if the number of Diameter hosts can be determined based on the number of mapped hostnames. Diameter node identification information may be a subset of Diameter topology information that is usable to identify a Diameter node. Examples of Diameter node identification information may include any parameter value contained in a Diameter signaling message, such as, but not limited to, an origin-host parameter value, a topology parameter value, a destination-host parameter value, a session identification (session-ID) parameter value, a route-record parameter value, or any other parameter value that provides data regarding network topology. In the example illustrated in FIG. 1, provider networks N1-N4 are four different, LTE network service providers (e.g., Sprint, Verizon, AT&T, and T-Mobile), each of which may or may not protect or hide Diameter node topology and/or node identification information in messages exchanged with the other provider networks N1-N4.

In some embodiments, a network for which a service provider intends to protect or hide Diameter node topology and/or node identification information in a Diameter signaling message may be classified as a "Protected Network" and may maintain a corresponding "white list" of trusted network service providers and a "black list" of untrusted network service providers. In some embodiments, network service providers in a multi-service provider environment that are not on the "white list" of a Protected Network may be untrusted network service providers that are "blacklisted". (See, e.g., FIG. 3).

Provider networks N1-N4 may each comprise at least one network node and an edge agent. In FIG. 1, network nodes A-D are each representative of one or more network nodes in the network of a particular service provider. Nodes A-D may be a mobility management entity (MME), a home subscriber server (HSS), or a policy and charging rules function (PCRF). The MME may be configured to perform authentication and tracking of the end user devices, the HSS may be configured to store mobile subscription data, and the PCRF may be configured to provide policy and charging control functions. Nodes A-D may comprise other network nodes, such as an online charging system (OCS) and/or an offline charging system (OFCS), to provide charging-related services to network subscribers.

In this regard, nodes A-D may each be communicatively connected to either an edge agent 102A-102D in each service provider network or to a Diameter agent 104 in intermediate network IN, which includes a topology hiding module (THM) 106 for performing selective topology hiding for Diameter signaling messages. As will be described in greater detail below, THM 106 performs selective topology hiding for received Diameter messages so that the secrecy of the Diameter node topology and node identification information of the network service provider in which the node is located is preserved. In some embodiments, THM 106 includes a software based module that is executed by a hardware based processor or processing unit in Diameter agent 104.

Diameter agent 104 may be any suitable node capable of receiving, relaying, routing, translating, and/or forwarding Diameter signaling messages. In some embodiments, Diameter agent 104 may be a DSR that routes Diameter signaling messages based on Diameter information contained within the signaling messages. Diameter agent 104 may be, in addition to or instead of a DSR, one or more of: a Diameter relay agent, a Diameter proxy agent, a Diameter redirect agent, or a Diameter translation agent, as described in IETF RFC 6733, the disclosure of which is incorporated herein by reference in its entirety.

In some embodiments, Diameter agent 104 includes THM 106 that is configured to perform topology hiding in both session-less and session based environments in order to protect or hide an identity and/or a number of network elements, nodes, and/or hosts in a protected service provider network. For example, THM 106 may comprise functionality for performing topology hiding for a discriminate portion of Diameter signaling messages received at Diameter agent 104 including, but not limited to, screening ingress (e.g., Request and Answer) Diameter signaling messages, associating corresponding network nodes (e.g., nodes A-D), determining topology hiding type, and performing topology hiding and/or restoral (see, FIG. 2). Diameter agent 104 is able to perform selective topology hiding and restoral capabilities by deriving the type of topology hiding to be applied on the ingress Diameter signaling messages dynamically, and then performing the topology hiding and/or restoral according to the derived topology hiding type. Thus, when configured as described herein, Diameter agent 104 becomes a special purpose computing platform that can improve the technological field of selective Diameter topology hiding.

Figure 2:
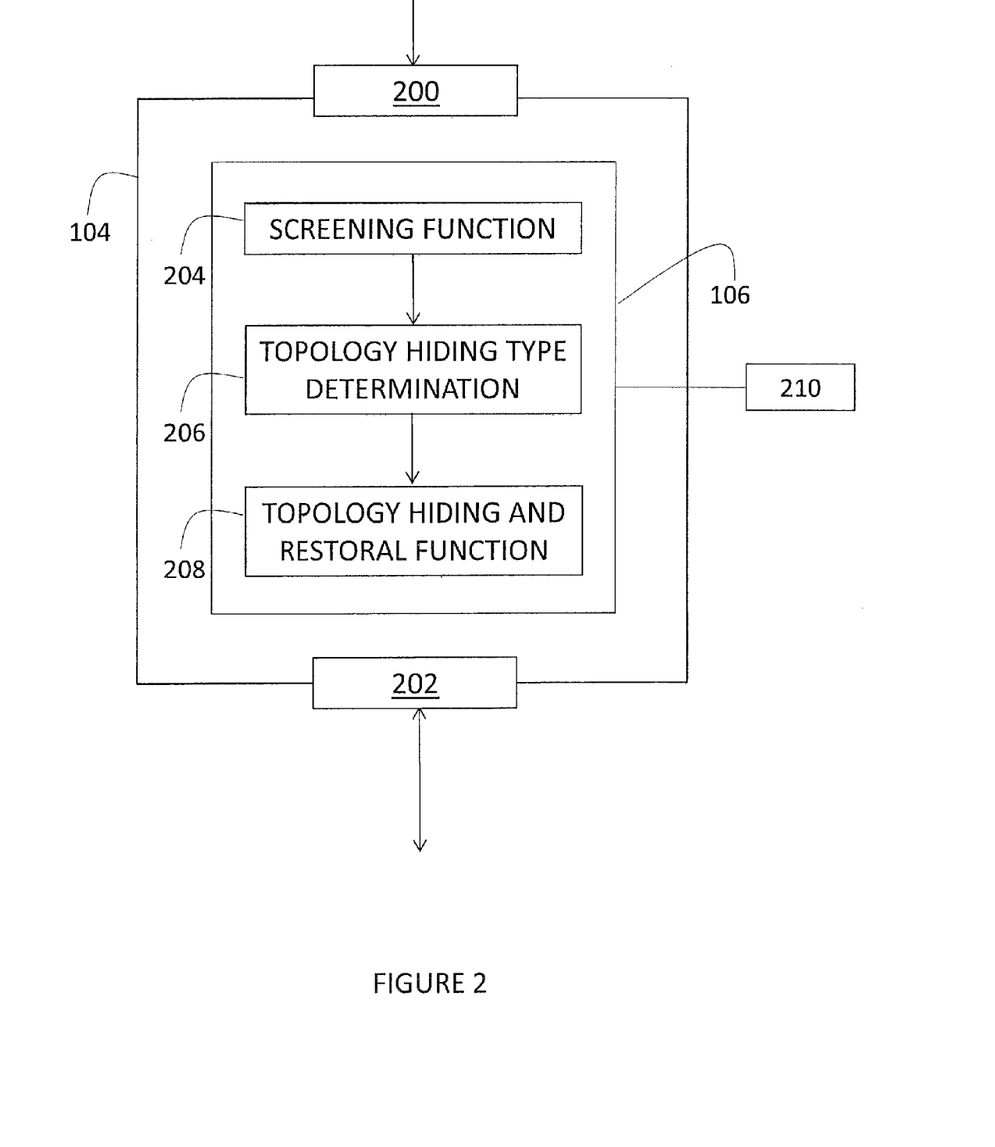
FIG. 2 is a block diagram illustrating functionality of an exemplary THM of a Diameter agent according to an embodiment of the subject matter described herein.

FIG. 2 is a block diagram illustrating an exemplary Diameter agent according to an embodiment of the subject matter described herein. A Diameter agent, such as Diameter agent 104, may comprise THM 106 that is configured to perform topology hiding on a discriminate portion of Diameter signaling messages received at Diameter agent 104. In some embodiments, Diameter agent 104 may include one or more network interfaces 200, 202 and a routing module 210, in addition to THM 106. For example, Diameter agent 104 may include submodules 204-208 to be discussed in greater detail below. It will be understood that Diameter agent 104 may comprise additional components and is not limited to only the components shown in FIG. 2.

Diameter agent 104 may be configured to receive a Diameter signaling message, such as a Diameter Update Location Request (ULR) message, at network interface 200 from an origin node in an origin realm (e.g., a first network service provider). The message may then be passed to THM 106, which may then be configured to determine if topology hiding needs to be performed on the message, via modifying an attribute-value pair (AVP) parameter value of the Diameter signaling message, before being routed to its destination. If THM 106 determines that topology hiding does need to be performed on the message, THM 106 may be configured to screen the message (i.e., determine the trust relationship between the origin and destination networks), determine the topology hiding type, and perform topology hiding according to the topology hiding type in order to hide node identity information and/or other information usable to derive the topology in the origin realm before forwarding the modified Diameter signaling message to a routing module 210. Routing module 210 may determine an appropriate destination node of the Diameter signaling message and route it through network interface 202 to the appropriate destination node in a destination realm (e.g., a second service provider network). Alternatively, if THM 106 determines that topology hiding need not be performed on the message, the message is not modified by THM 106 and, instead, is forwarded to routing module 210 for further routing through network interface 202 to the appropriate destination node in the destination realm.

Diameter agent 104 may also be configured to receive a response message, such as a Diameter Update Location Answer (ULA) message, at a network interface 202 from the destination node in the network service provider destination realm. Where the destination node transmits a response message, the destination node becomes an origin node. For example, the destination node in the second network service provider is an origin node and the origin node in the first network service provider is a destination node. The ULA may then be passed to THM 106, which may determine if an AVP parameter value(s) of the Diameter signaling message needs to be restored, which will be discussed in more detail below. If restoration needs to be performed, THM 106 may be configured to modify the message (e.g., replacing a pseudo hostname with the actual hostname in an AVP parameter value(s), where the pseudo hostname is sent by a node generating the response message, accordingly and to pass the modified ULA message to the routing module. The routing module may route the message to its destination node in the destination realm network service provider via network interface 200.

In some embodiments, topology hiding is performed by THM 106 on an ingress Diameter signaling message from a protected network wishing to hide an origin host name and/or other information usable to derive topology of the protected network from an untrusted network. In order to perform topology hiding THM 106 may first screen the ingress Diameter signaling message once it is received by Diameter agent 104 (e.g., at interface 200). THM 106 is configured with a screening function module, generally referred to as 204, to screen ingress Diameter signaling messages. In some embodiments, screening functionality module 204 may consist of hardware, which may also include software and/or firmware components, for inspecting Diameter node identification information (e.g., AVP parameter values) contained in the incoming message. For example, THM 106 may inspect an origin-realm value and a destination-realm value contained in the ingress Diameter signaling message in order to determine whether the origin realm is a protected network and whether the destination realm is a trusted network.

A first network service provider intending to hide Diameter node identification information of particular nodes in the network from other service networks (e.g., peer networks) serviced by an intermediate network (e.g., IN, FIG. 1), the first network service provider may be classified as a "protected network" and may maintain a corresponding "white list" of other, trusted network service providers. The other network service providers that are untrusted, may be maintained on a "black list" by the first network service provider. Trust relationship information may be communicated by each network service provider to the operator of THM 106. Such a model assumes that the operator of THM 106 is trusted by all of the network service providers. However, the subject matter described herein is not limited to such an embodiment. In an alternate embodiment, THM 106 may operate at an edge of a particular service provider's network and only contain trust relationship information for that particular service provider.

Figure 3A:
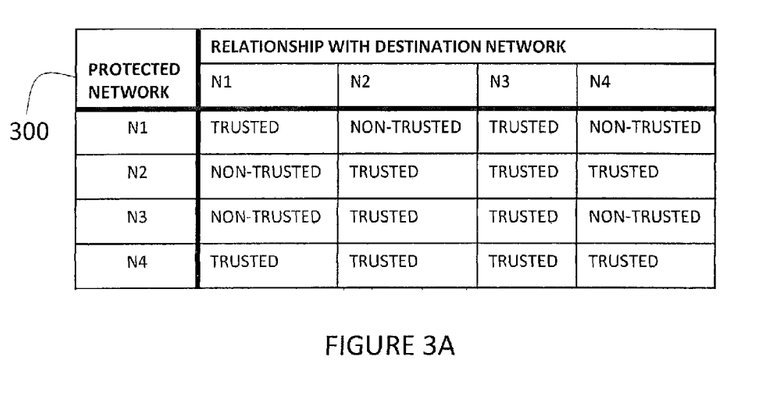
FIG. 3A is an exemplary data structure illustrating determination of a relationship between a first service provider network and a second service provider network according to an embodiment of the subject matter described herein.

In FIG. 3A, a data structure 300 is configured with trust relationship data for protected networks N1-N4. Data structure 300 may comprise a data table or other format for providing trust relationship data regarding protected networks N1-N4 that is stored or otherwise accessible by THM 106. In FIG. 3A, trust relationship information comprises an indication as to whether or not a destination network is defined as a trusted or non-trusted network by the protected network.

For example, data structure 300 contains a listing of protected network service providers in a multi-network service provider environment. A first network service provider network N1 is listed in data structure 300 as a protected network where first network service provider N1 intends to hide Diameter node identification information for particular network nodes from one or more other network service providers.

Accordingly, any networks on a protected network's "white list" may be defined as "TRUSTED" in data structure 300 from the perspective of the protected network. For example, protected network N1 defines networks N1 and N3 as trusted networks such that Diameter agent 104 need not perform topology hiding in order to hide Diameter node identification information from these trusted networks. Conversely, any networks on a protected network's "black list" may be defined as "NON-TRUSTED" in data structure 300 from the perspective of the protected network. For example, protected network N1 defines networks N2 and N4 as untrusted networks such that Diameter agent 104 may need to perform topology hiding in order to hide Diameter node identification information from these trusted networks. As to be discussed in greater detail below, whether or not topology hiding may need to be performed when a message is sent from a node in a protected network to a node in an untrusted network may depend on whether the origin node is configured to hide Diameter node identification information. Notably, trust relationships between each network serviced by an intermediate network can be illustrated in a data structure, such as the one depicted in FIG. 3A, in order for THM 106 to inspect, on a per network basis, each message received. The trust relationships between the networks may also be modified or updated.

As a result, THM 106 can determine whether topology hiding is to be performed based on the trust relationship between the protected network and the destination network. When THM 106 receives a Diameter signaling message, THM 106 can inspect the AVP parameter values (e.g., origin-realm and dest-realm) contained in the message to determine the protected network and the destination network. Once those values are determined, THM 106 can access data structure 300 in order to determine the trust relationship between the protected network and the destination network. For example, where the protected network is network service provider N2 and the destination network is network service provider N3, THM 106 may determine that network service provider N3 is a "TRUSTED" network from a perspective of network N2. Thus, topology hiding need not be performed to hide Diameter topology information contained in Diameter signaling messages being routed from protected network N2 to destination network N3. In another example, where the destination network is network service provider N1, THM 106 can determine that network service provider N1 is a "NON-TRUSTED" network from the perspective of network N2. Thus, topology hiding may be performed in order to hide Diameter topology identification information contained in Diameter signaling messages being routed from protected network N2 to destination network N1.

Screening function module 204 may also enable THM 106 to determine whether topology hiding or other functionality is to be performed for Diameter signaling messages associated with particular network nodes or entities in a protected network. For example, based on a first (i.e., origin) node and/or a second (i.e., destination) node, THM 106 may hide or obfuscate some topological and/or node identification information (e.g., located in AVP parameter values) in Diameter signaling messages traversing networks N1-N4.

In some embodiments, network nodes can comprise core network entities or nodes that are involved with the general management of network subscribers' communication experience. For example, core network entities may comprise those involved with authentication and tracking of the end user devices (e.g., MME), those configured to store mobile subscription data (e.g., HSS), those configured to provide policy and charging control functions (e.g., PCRF), and those configured to establish quality of service (QoS) of the end user devices (e.g., Application Function (AF)).

Figure 3B:
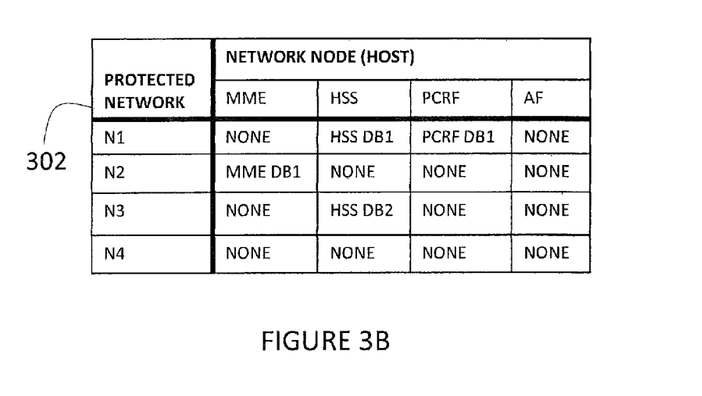
FIG. 3B is an exemplary data structure illustrating association of a database for hiding address entities at a THM according to an embodiment of the subject matter described herein.

In some embodiments, THM 106 may be provisioned with information for determining whether topology hiding or other functionality is to be performed for messages associated with particular network nodes in a protected network. In FIG. 3B, THM 106 may comprise a data structure 302 containing information regarding identification of network nodes associated with a protected network for which the protected network wishes to hide the identity. Data structure 302 may comprise a data table or other format for providing identity of network nodes associated with a protected network for which the protected network wishes to hide the identity. For example, protected network N1 may provide THM 106 with an identity of two associated databases located in protected network N1—"HSS DB1" and "PCRF DB1" for which topology hiding is to be performed. In another example, protected network N4 may not provide THM 106 with any associated databases located in protected network N4. In this example, since no information is provided to THM 106 for indicating that topology hiding is to be performed, the topology information located in origination network N4 may be exposed to any of destination networks N1-N3, as determined by protected network N4's "white list". In such a case, topology hiding may not be performed.

In some embodiments, e.g., after determining topology hiding is to be performed, THM 106 may determine a topology hiding type by discriminating (e.g., identifying) ingress Diameter signaling messages associated with application-identifications (IDs) and command codes and then deriving a type of topology hiding to be applied based on the discriminated ingress message. THM 106 is configured with a topology hiding type determination module 206 (illustrated in FIG. 2), for determining Diameter topology hiding type. Topology hiding type determination module 206 may consist of hardware, which may also include software and/or firmware components, for deriving or identifying the origin node type and the destination node type using parameters in the Diameter signaling messages. For example, using the data in FIG. 4A, if a ULR message with application ID '16777251' is received, topology hiding type determination module 206 determines that the message is from an MME initiator node and destined to an HSS destination node. A generic identification of a type of corresponding message initiator node and destination node may be stored at THM 106 in a format such as that illustrated in FIGS. 4A-4B.

Figure 4A:
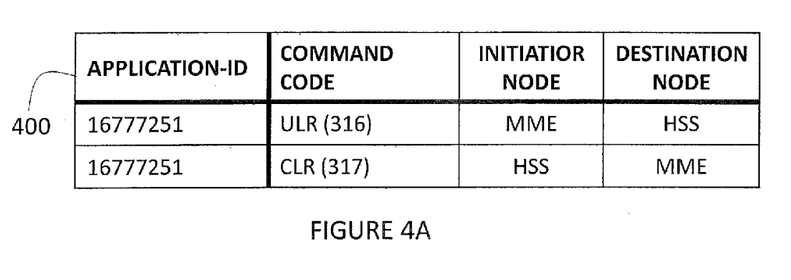
FIG. 4A is an exemplary data structure illustrating a session-less interface for determination of topology hiding type at a THM according to an embodiment of the subject matter described herein.
Figure 4B:
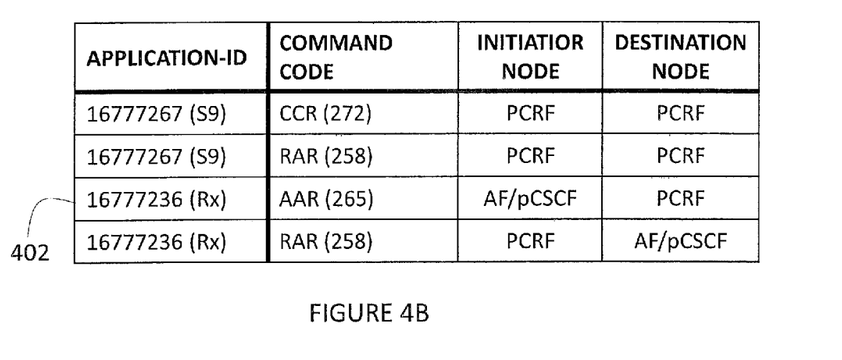
FIG. 4B is an exemplary data structure illustrating a session based interface for determination of topology hiding type at a THM according to an embodiment of the subject matter described herein.

Message initiator data structures 400 and 402 are illustrated in FIGS. 4A and 4B for provisioning THM 106 with message mapping capabilities on a session-less and session based interface, respectively. For example, data structures 400 and 402 may be separately configured by a network operator to associate various application-IDs, command codes, initiator nodes, destination nodes, etc., for both session based and session-less interfaces. Examples of both session based and session-less interfaces for an LTE communications network may include, but are not limited to S1-MME, S1-U, S3, S4, S5, S6a, Gx, S8, S9, S10, S11, S12, S13, SGi, Rx, and SBc. In some embodiments, data structures 400 and 402 may be configured as one data structure or any other format for providing THM 106 with an ability to compare Diameter node information stored in AVP parameter values of an ingress Diameter signaling message with the corresponding stored data values in order to determine generic initiator node and/or destination node types.

In some embodiments, data structures 400 and 402 may be dynamically configured and may support updates to the information stored in the structures corresponding to, for example, new and/or required Diameter interfaces. Accordingly, Diameter signaling message mapping may be dynamically performed by THM 106 in view of a direction or flow of the message (i.e., which is the initiator node and which is the destination node).

Referring to FIG. 4A, message initiator data structure 400 may be usable to perform Diameter signaling message mapping on a session-less interface. In FIG. 4A, the reference point may be an S6a/S6d reference point. Operator configured application-IDs, command codes, initiator nodes, and corresponding destination nodes based on such an interface (e.g., S6a/S6d) may be stored in data structure 400 for comparison with an application-ID and command code contained in an ingress Diameter signaling message. In some embodiments, upon receiving an ingress Diameter signaling message, topology hiding type determination module 206 may be configured to compare the application-ID and command code stored in the Diameter AVP parameter values with the application-ID and command codes stored in data structure 400 to determine the corresponding initiator node and destination node.

Referring to FIG. 4B, message initiator data structure 402 may be usable to perform Diameter signaling message mapping on a session based interface. In FIG. 4B, the reference point may be an S9 reference point. Operator configured application-IDs, command codes, initiator nodes, and corresponding destination nodes based on such an interface (e.g., S9) may be stored in data structure 402 for comparison with an application-ID and command code contained in an ingress Diameter signaling message. In some embodiments, upon receiving an ingress Diameter signaling message, topology hiding type determination module 206 may be configured to compare the application-ID and command code stored in the Diameter AVP parameter values with the application-IDs and command codes stored in data structure 402 to determine the corresponding initiator node and destination node.

Accordingly, in light of message initiator data structures 400 and 402, topology hiding type determination module 206 may be configured to determine a generic type of an initiator node from AVP parameter values regardless of whether the environment is session-less or session based. Based on such information, topology hiding type determination module 206 may then be able to use the generic type of initiator node corresponding to the application-ID and command code contained in a Diameter signaling message to determine whether the initiator node from the protected network is a network node whose identification and/or topological information is to be hidden; thereby determining which type of topology hiding should be used for hiding the Diameter node identification information in the Diameter message.

In some embodiments, topology hiding type determination module 206 may refer to data structure 302 to determine whether the generic type of initiator node identified by topology hiding type determination functionality module 206 is one of the specific databases identified by the protected network for hiding Diameter node identification information in Diameter signaling messages traversing various peer networks. For example, topology hiding type determination module 206 may receive a Diameter signaling message from protected network N1. AVP parameter values of the Diameter signaling message may contain Diameter node values for the application-ID and the command code (e.g., 'Application Id=16777267 (S9)' and 'Command Code=CCR'. Using data structure 402, topology hiding type determination module 206 may determine that a generic initiator node for this Diameter message is a 'PCRF'. In order to specifically determine the type of topology hiding to be performed, THM 106 may refer to data structure 302 to determine whether protected network N1 comprises an associated PCRF for which topology information is to be hidden. In this example, data structure 302 indicates that protected network N1 has one associated PCRF configured to hide identity information—'PCRF DB1'.

In some embodiments, THM 106 is also configured with a topology hiding and restoral functionality module 208. Topology hiding and restoral functionality module 208 may consist of hardware, which may also include software and/or firmware components, for hiding Diameter node identification information (e.g., in AVP parameter values) and/or restoring Diameter node identification information (e.g., in AVP parameter values) in a Diameter signaling message. Topology hiding of Diameter node identification information, such as in the AVP parameter values, in a Diameter signaling message may comprise two separate topology hiding functionalities. A first topology hiding functionality may comprise hiding an identity of an origin node in the protected network that is sending a Diameter signaling message to a destination node in an untrusted, peer network. For example, where N1 is the protected network, a message with a destination node in network service provider N4 may request topology hiding for hiding the identity of the origin node in protected network N1 since network N4 is an untrusted network from the perspective of protected network N1 (see, 300, FIG. 3A). Topology hiding and restoral functionality module 208 may be configured to hide an identity of a node using, for example, replacement of actual host name information with a pseudo host name, to be described in more detail below.

A second topology hiding functionality may comprise hiding topology information usable for a node in an untrusted destination network to derive and/or identify a number of network nodes in the protected network. In particular, by hiding the topology information, the untrusted network may be unable to deduce how many nodes are members of the protected network based upon the content of the messages that the untrusted network receives from the protected network. For example, where N1 is the protected network, a message with a destination node in untrusted network service provider N4 would request topology hiding to hide topology information (i.e., Diameter node identification information) associated with an origin node in order to prevent network service provider N4 from identifying and/or deriving a number of network nodes in protected network N1. In some embodiments, topology hiding and restoral functionality module 208 may be configured to hide the topology information by replacing network node hostnames with either a single pseudo hostname for the protected network or replacing network node hostnames with one or more randomly generated pseudo hostname that may be unique to each network node.

Figure 5:
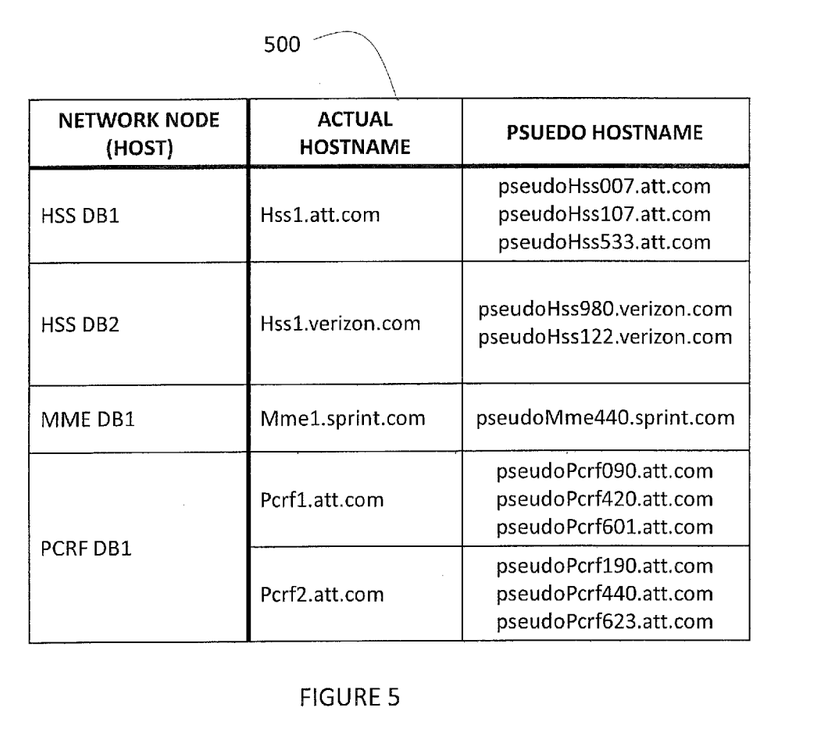
FIG. 5 is an exemplary data structure illustrating determination of topology hiding and restoral function at a THM according to an embodiment of the subject matter described herein.

In some embodiments, where each network node hostname is replaced with a randomly generated pseudo hostname, topology hiding and restoral functionality module 208 may be configured to map the pseudo hostnames with each actual hostname assigned with to each network node. In some embodiments, for example, mapping of pseudo-to-actual hostnames may occur during a transaction CCR/CCA exchange or during subsequent transactions initiated by the untrusted network to the protected network. Referring to FIG. 5, a data structure 500 may be usable by THM 106 to provide a mapping of each network node or host whose identity is to be hidden. Data structure 500 may comprise a data table or other format for providing pseudo-to-actual hostname matching that is stored or otherwise accessible by topology hiding and restoral functionality module 208. Each network node may be associated with at least one actual hostname and at least one selected pseudo hostname. As illustrated in FIG. 5, for example, each pseudo hostname is unique to a specific network node, although a network node can comprise more than on pseudo hostname for each associated actual hostname of the node.

Accordingly, topology hiding and restoral functionality module 208 may be configured to perform topology hiding using data structure 500. In particular, topology hiding and restoral functionality module 208 may be configured to select a pseudo hostname to be assigned to an actual hostname of a network node in order to replace the actual hostname in the stored AVP parameter values contained in the ingress Diameter signaling message. In some embodiments, topology hiding and restoral functionality module 208 may comprise functionality to input specific parameters into an algorithm to obtain a unique pseudo hostname assigned to the network node. One exemplary algorithm may comprise:

pseudo hostname selected=HASH (session-ID AVP parameter value) MODULO (Number of pseudo hostnames assigned to the network node), where a HASH is done of session-ID AVP parameter value in order for Diameter signaling messages of a same session to consistently select a same pseudo hostname each time and session-ID parameter value is input into the algorithm. In some aspects, the session-ID AVP parameter value may begin with a sender's identity (i.e., the actual hostname of the origin node), while the remainder of the session-ID AVP parameter value may be any sequence that the client can guarantee to be eternally unique per IETF RFC 6733.

In some embodiments, a network node may resolve into different pseudo hostnames for a different session-ID parameter value input into the algorithm. Accordingly, using this exemplary algorithm, THM 106 may input AVP parameter values from an ingress Diameter signaling message, such as a session-ID value. In this manner, any message generated with a same session-ID value may be mapped to the same network node via the pseudo hostname so that messages associated with the same session will be routed to the same destination node. Topology hiding and restoral functionality module 208 may also be configured to input into the algorithm a number of pseudo hostnames assigned to the network node via reference to data structure 500. For example, where THM 106 has determined the network node transmitting the Diameter signaling message, THM 106 may access data structure 500 and determine, based on the actual hostname, how many pseudo hostnames are associated with the actual hostname of the network node. For example, where the network node is 'HSS DB1' and the actual hostname is 'Hss1.att.com', THM 106 may reference data structure 500 and determine how many pseudo hostnames are associated with the actual hostname 'Hss1.att.com'. Referring to FIG. 5, there are three pseudo hostnames mapped to actual hostname 'Hss1.att.com' for 'HSS DB1'. These pseudo hostnames comprise 'pseudoHss007.att.com', 'pseudoHss107.att.com', and 'pseudoHss533.att.com'.

In this embodiment, based on the input of the session-ID and the number of pseudo hostnames assigned to the network node into the algorithm, the algorithm may output a selected pseudo hostname for replacing the actual hostname stored in any AVP parameter values. For example, the selected pseudo hostname may be used to replace the actual hostname stored as the 'origin-host' and/or the 'session-ID' in the Diameter signaling message to be forwarded to the destination node in the untrusted network. Thus, when the destination node receives the forwarded message, the actual hostname of the network node will be hidden and replaced with the pseudo hostname for the origin host and/or the 'session-ID' value. Likewise, topology hiding and restoral functionality module 208 may be configured to use the exemplary algorithm for restoral functionality of the actual hostname in the stored AVP parameter values (e.g., actual hostname for the 'origin-host' and/or 'session-ID') contained in a Diameter signaling message that was previously modified with the pseudo hostname in the stored AVP parameter values (e.g., pseudo hostname for the 'origin-host' and/or 'session-ID').

Accordingly, performance of topology hiding in the manner described above introduces a very flexible and scalable approach for applying topology hiding treatment on messages belonging to session based and session-less Diameter applications, by supporting messages from other Diameter network architecture interfaces dynamically, rather than being limited to a particular interface. Thus, intelligently discriminated messages may receive topology hiding treatment based on operator's needs, expectations, requirements, etc.

Figure 6:
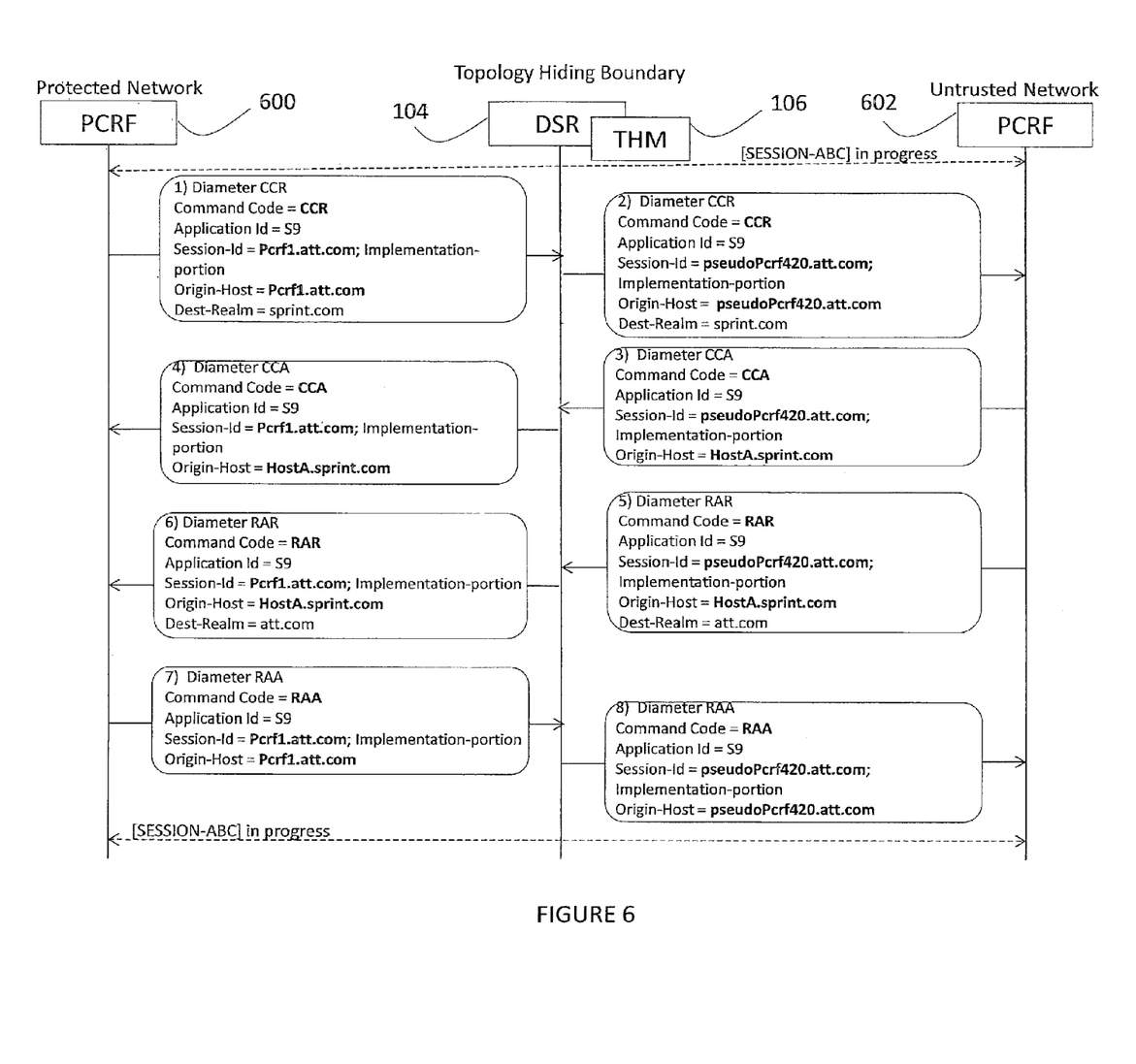
FIG. 6 is a signaling message flow diagram illustrating exemplary Diameter signaling messages received and forwarded by a Diameter agent configured to perform selective Diameter topology hiding according to an embodiment of the subject matter described herein.

Now referring to FIG. 6, a signaling flow diagram provides an exemplary instance of both topology hiding and restoral functionality of Diameter node identification information contained in Diameter signaling messages. It will be understood by those of skill in the art that other types of Diameter node identification information parameters and Diameter signaling messages may be utilized without departing from the scope of the present subject matter. In FIG. 6, a signaling message flow diagram illustrating topology hiding and restoral of an 'origin-host' parameter value and/or 'session-ID' parameter value in Diameter request and answer messages according to an embodiment of the subject matter described herein. In the illustrated example, session [ABC] is in progress during transmission of messages between a PCRF 600 in a first network service provider (e.g., AT&T network) and a PCRF 602 in a second network service provider (e.g., Sprint network), for a Sprint customer roaming on AT&T's network. In FIG. 6 AT&T's PCRF 600 does not know the specific node information for Sprint's PCRF 602. Instead, PCRF 600 only knows that the roaming mobile subscriber is a Sprint customer. Notably, in this embodiment, AT&T network does not trust Sprint network, although Sprint network does trust AT&T. However, in some embodiments, both AT&T network and Sprint network may not trust each other, or AT&T network may trust Sprint network, and Sprint network may not trust AT&T.

In message (1), PCRF 600 sends a Credit-Control-Request (CCR) message directed to Sprint's domain or realm (e.g., "Dest-Realm=sprint.com"). In some embodiments, the CCR message may include Diameter node identification information (e.g., in Diameter AVP parameter values), including but not limited to, a command code, an application-ID, an origin realm, a session-ID, an origin-host, and/or a destination realm. Other Diameter node identification information (e.g., in other Diameter AVP parameter values) may also be included in the CCR message, such as, but not limited to an origin realm. For example, the parameters and respective parameter values depicted in FIG. 6 include 'Command Code=CCR', 'Application ID=session; Pcrf1.att.com', 'Origin-Host=Pcrf1.att.com', and Dest-Realm=sprint.com'.

In some embodiments, the CCR message is received by Diameter agent 104, which includes THM 106. Diameter agent 104 may be associated with the AT&T network (e.g., DSR.ATT.NET). In some embodiments, Diameter agent 104 may reside in an intermediate network (e.g., IN, FIG. 1) that links the AT&T and Sprint networks. For example, Diameter agent 104 may be located in the intermediate network IN and may be configured to hide network nodes residing in both AT&T and Sprint's networks. Although only one Diameter agent is depicted in FIG. 6 additional Diameter agents provisioned with a THM may be utilized without departing from the scope of the present subject matter (e.g., a DSR located in the Sprint destination network, such as DSR-.SPRINT.NET). Diameter agent 104 may be configured to evaluate the message, determine whether the destination network (e.g., Sprint network) is a trusted or untrusted network from the perspective of the origin network (e.g., AT&T network), discriminate (e.g., inspect) the CCR message to derive the type of topology hiding to be applied, and perform topology hiding and/or restoral to replace the actual hostname associated with the origin host with a pseudo hostname and vice versa, in at least the origin-host parameter value and in the session-ID parameter value.

For example, THM 106 may be configured to refer to a data structure (e.g., FIG. 3A) in order to determine the trust relationship between AT&T and Sprint, from AT&T's perspective. If THM 106 determines that Sprint is a trusted network from AT&T's perspective, no topology hiding of the origin host in the AT&T network is necessary and THM 106 may forward the message to the appropriate destination node in the Sprint network. However, if THM 106 determines that Sprint is an untrusted network from AT&T's perspective, as in the current example, topology hiding may be performed at THM 106 between messages (1) and (2).

In some embodiments, using Diameter node identification information, THM 106 may be configured to identify an initiator node and/or a destination node of a Diameter signaling message. For example, THM 106 may determine Diameter node identification information in AVP parameter values of the Diameter signaling message. In this example, the AVP parameter values may include stored application-ID values and command code values. THM 106 may then compare the values from the Diameter signaling message with those stored in a second data structure (e.g., FIGS. 4A and 4B). In some embodiments, the initiator node and the destination node associated with an operator configured application-ID value and command code value are stored in the second data structure, where the application-IDs and command codes obtained from a Diameter signaling message may be used as an input to look up the associated generic initiator nodes and destination nodes in a third data structure (e.g., FIG. 3B).

In some embodiments, once the initiator node and the destination node are identified, the type of topology hiding to be performed may be determined. For example, THM 106 may inspect a Diameter signaling message and determine that the Diameter signaling message comprises a command code value of 'CCR(272)' and an application ID value of '16777267 (S9)'. In the corresponding second data structure, THM 106 may use these parameter values to determine that the initiator node is a PCRF (e.g., PCRF 600) and the destination node is a PCRF (e.g., PCRF 602).

In some embodiments, e.g., after a topology hiding type is determined, THM 106 may then be configured to perform topology hiding according to the determined topology hiding type. For example, THM 106 may hide both the origin node identification information and the number of network nodes in the protected network service provider. In this example, THM 106 may be configured to replace the actual origin hostname of each network node with a single pseudo hostname or replace the actual origin hostname of each network node with at least one pseudo hostname. A fourth data structure (e.g., FIG. 5) comprising the network node (host) (e.g., 'PCRF DB1') and at least one actual hostname and at least one associated pseudo hostname may be accessible by THM 106. As a result, THM 106 may refer to the fourth data structure in order to determine the pseudo hostname to replace the actual hostname of the origin node with. Where the actual origin hostname of a network node is associated with more than one unique pseudo hostname, THM 106 may utilize an algorithm in order to select the pseudo hostname to replace the actual hostname with. Still referring to the current example, the topology hiding type PCRF 'DB1' comprises two actual hostnames: 'Pcrf1.att.com' and 'Pcrf2.att.com'. Based on the Diameter signaling message, the origin node is 'Pcrf1.att.com'. Thus, THM 106 is able to refer to the fourth data structure to determine the pseudo hostname associated with 'Pcrf1.att.com'. Here, the fourth data structure comprises three unique pseudo hostnames associated with 'Pcrf1.att.com'—'pseudoPcrf090.att.com'; 'pseudoPcrf420.att.com'; and 'pseudoPcrf601.att.com'. In order to select which pseudo hostname should be used to replace the actual hostname (e.g., Pcrf1.att.com), the following session-ID parameter value is input into the algorithm discussed above: [HASH(pcrf1.att.com; Implementation-portion) MODULO 3]. The output of the algorithm is 'pseudoPcrf420.att.com'. As a result, THM 106 may replace the actual hostname in the Diameter signaling message with 'pseudoPcrf420.att.com' before routing the message to the appropriate destination node (e.g., PCRF 602) in the destination realm specified in the message.

In message (2), the Diameter agent 104 has performed topology hiding, as discussed above, and hidden the actual origin hostname in the Diameter signaling message. For example, both the session-ID value and the origin-host value have been modified to include the pseudo hostname 'pseudoPcrf420.att.com'. Thus, when PCRF 602 in the untrusted Sprint network receives message (2), PCRF 602 may then respond with a CCA message directed to PCRF 600 via Diameter agent 104 (see message (3)).

In some embodiments, PCRF 602 may be configured to modify Diameter node identification information (e.g., in AVP parameter values) in message (3) in response to the CCR message. For example, PCRF 602 may replace the origin-host value (e.g., pseudoPcrf420.att.com) in message (3) with the actual hostname of the origin node (e.g., PCRF 602). In this example, message (3) comprises 'origin-host=HostA.sprint.com', in reference to the actual hostname of PCRF 602.

In some embodiments, Diameter agent 104 may perform topology restoral in order to revert the Diameter node identification information (e.g., in AVP parameter values), which was initially replaced in message (2) with a unique pseudo hostname, back to the actual hostname for the origin node. In such an embodiment, THM 106 may utilize the algorithm that was originally used for selecting the pseudo hostname in the aforementioned CCR message. For example, Diameter agent 104 may receive message (3) and perform topology restoral on the session-ID value to replace "pseudoPcrf420.att.com' with 'Pcrf1.att.com'. Diameter agent 104 may then be configured to forward a message (see message (4)) to the appropriate destination node. For example, Diameter agent 104 may forward CCA message (4) to PCRF 600 with the session-ID restored to the actual hostname of the origin node. In some embodiments, topology hiding may not be applied to the origin node. For example, in message (4), the actual hostname of the origin node was not hidden by THM 106 because AT&T network is a trusted network from the perspective of Sprint network. Regardless, PCRF 600 and PCRF 602 may transmit messages during a session (e.g., session ABC) without PCRF 602 having knowledge of the actual hostname of the origin node and without knowledge of how many network nodes are in AT&T network.

In some embodiments, the untrusted network may initiate communication with the protected network during a same session (e.g., session ABC). In FIG. 6, PCRF 602 may wish to send an RAR message (e.g., message (5)) intended for PCRF 600. Namely, the Diameter RAR message may be directed to PCRF 600 via Diameter agent 104. In some embodiments, the RAR message includes Diameter node identification information that identifies PCRF 602 as the origin node (e.g., 'origin-host=HostA.sprint.com' and AT&T network service provider as the destination network (e.g., 'Dest-Realm=att.com'). The Diameter RAR message also includes a session-ID AVP parameter value that comprises the pseudo hostname generated previously (e.g., message 2).

Upon receiving the Diameter RAR message, Diameter agent 104 may be configured to restore the session-ID AVP parameter value comprising the pseudo hostname to the actual session-ID AVP parameter value. For example, Diameter agent 104 may restore the pseudo hostname included in the session-ID AVP parameter value (e.g., 'pseudoPcrf420.att.com') back to the actual hostname included in the session-ID AVP parameter value (e.g., 'Pcrf1.att.com'), as shown in message (6) in FIG. 6. In this example, THM 106 may utilize the algorithm that was originally used to select the pseudo hostname in the aforementioned CCR message.

PCRF 600 may then receive Diameter RAR message (e.g., message (6)) that includes the actual hostname as the session-ID AVP parameter value. PCRF 600 may respond to the received RAR message by sending an RAA message (e.g., message (7)) to PCRF 602 via Diameter agent 104. In some embodiments, the RAA message may be transmitted to Diameter agent 104 for topology hiding, as discussed hereinabove. For example, Diameter agent 104 may receive message (7) and perform topology hiding in order to replace the actual hostname of the origin node in the origin host AVP parameter value (e.g., 'origin-host=pcrf1.att.com') and the session-ID AVP parameter value (e.g., 'session-ID='Pcrf1.att.com') with a unique pseudo hostname (e.g., 'pseudoPcrf420.att.com'). Thus, the Diameter RAA message transmitted to PCRF 602 contains AVP parameter values (e.g., stored origin node and session-ID values) containing the pseudo hostname selected by THM 106 (e.g., 'origin-host=pseudoPcrf420.att.com' and 'session-ID='pseudoPcrf420.att.com').

Figure 7:
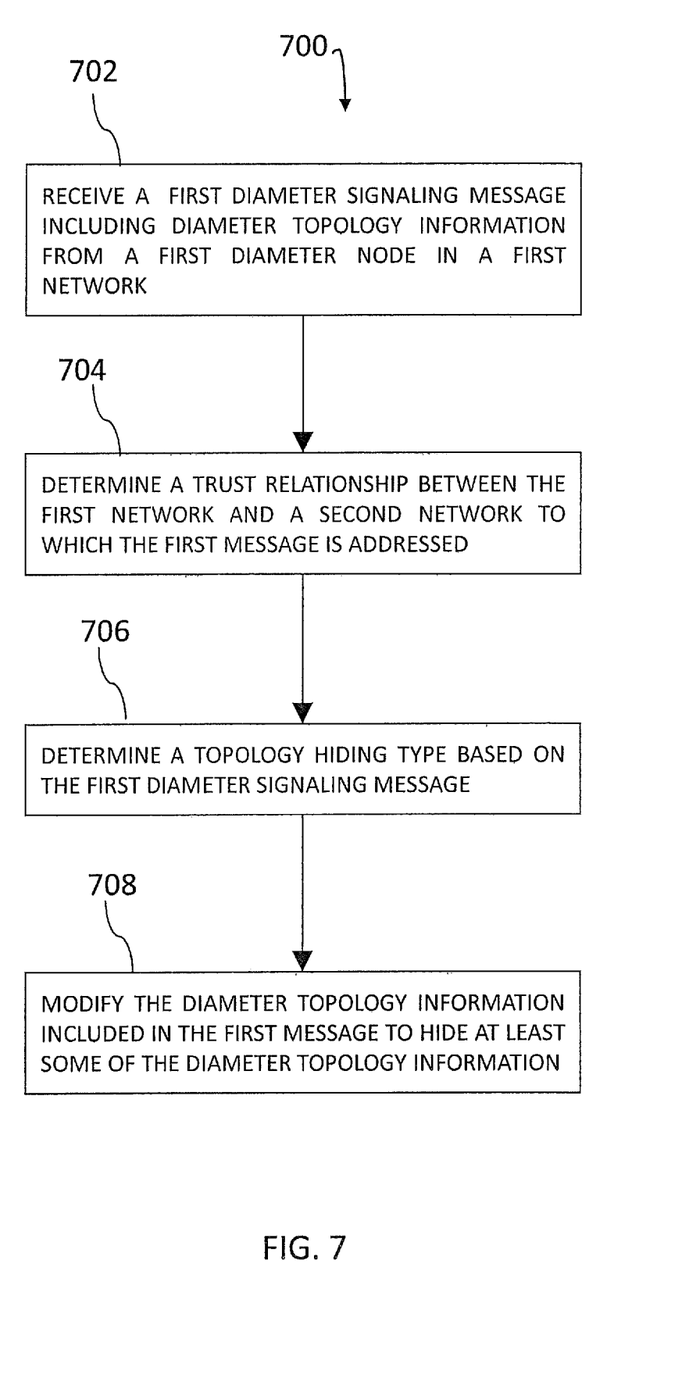
FIG. 7 is a flow chart illustrating an exemplary process for performing selective Diameter topology hiding according to an embodiment of the subject matter described herein.

FIG. 7 is a flow chart illustrating an exemplary process for performing topology hiding of Diameter node identification information contained in Diameter signaling messages according to an embodiment of the subject matter described herein. In block 702, a first Diameter signaling message is received from a first or origin Diameter node in a first service provider network. In some embodiments, a DSR may receive a Diameter request message (e.g., Diameter CCR message) that is addressed to a second or destination Diameter node in a second service provider network. Notably, the CCR message may include Diameter topology information for the first Diameter node. The Diameter topology information may be contained in Diameter headers or AVP parameter values associated with the Diameter originating node, such as, for example, an origin-realm AVP parameter value, an origin-host AVP parameter value, a session-ID AVP parameter value, and a topology AVP parameter value.

In block 704, a trust relationship between the first service provider network and the second service provider network to which the first Diameter signaling message is addressed may be determined. Notably, the trust relationship from the perspective of the first network service provider may be determined.

In block 706, a topology hiding type based on the first Diameter signaling message is determined in response to determining that the trust relationship requires at least some level of topology hiding.

In block 708, the Diameter topology information included in the first Diameter signaling message is modified, based on the topology hiding type determined in block 706, to hide at least some of the Diameter topology information.

It will be understood that various details of the subject matter described herein may be changed without departing from the scope of the subject matter described herein. Furthermore, the foregoing description is for the purpose of illustration only, and not for the purpose of limitation.

What is claimed is:

1. A system for selective Diameter topology hiding, the system comprising:
   a Diameter agent including:
      a network interface configured to receive, from a first Diameter node in a first service provider network, a first Diameter signaling message including Diameter topology information; and
      a Diameter topology hiding module (THM) configured to:
         determine that a trust relationship between the first service provider network and a second service provider network to which the first Diameter signaling message is addressed requires at least some level of topology hiding, in response to determining that the trust relationship requires at least some level of topology hiding, determine a topology hiding type based on the first Diameter signaling message, and modify, based on the topology hiding type, the Diameter topology information included in the first Diameter signaling message to hide at least some of the Diameter topology information, wherein the Diameter agent is further configured to route Diameter messages from the first service provider network to a third service provider network, to determine that the first service provider network identifies the third service provider network as a trusted network, and to refrain from performing Diameter topology hiding for the Diameter messages routed from the first service provider network to the third service provider network.

2. The system of claim 1 further comprising a routing module for routing the modified first Diameter signaling message to a second Diameter node in the second service provider network.

3. The system of claim 2 wherein the Diameter THM is configured to determine the topology hiding type by identifying an origin node type of the first Diameter node and a destination node type of the second Diameter node.

4. The system of claim 2 wherein the Diameter THM is further configured to receive, from the second Diameter node in the second service provider network, a second Diameter signaling message including the modified Diameter topology information, wherein the Diameter THM is further configured to replace the modified Diameter information in the second Diameter signaling message with the Diameter topology information for the first Diameter node, and wherein the Diameter THM is further configured to forward the second Diameter signaling message including the Diameter topology information for the first Diameter node to the first Diameter node.

5. The system of claim 1 wherein the Diameter THM is configured to modify the Diameter topology information included in the first Diameter signaling message by replacing the at least some Diameter topology information with pseudo information.

6. The system of claim 1 wherein the Diameter topology information contained in attribute-value pair (AVP) parameter values in the first Diameter signaling message includes at least one of: an origin-host parameter value, an origin-realm parameter value, a destination-host parameter value, a destination-realm parameter value, and a route-record parameter value.

7. The system of claim 6 wherein the modified Diameter topology information comprises at least a pseudo origin-host parameter value.

8. The system of claim 7 wherein the Diameter THM is further configured to select the pseudo origin-host parameter value using a hash function.

9. The system of claim 1 wherein the Diameter agent includes at least one of: a Diameter signaling router (DSR), a Diameter relay agent, a Diameter proxy agent, a Diameter redirect agent, and a Diameter translation agent.

10. The system of claim 1 wherein the Diameter agent is configured to communicate Diameter signaling messages in both a session-less and a session based environment.

11. A method for selective Diameter topology hiding, the method comprising:

at a Diameter agent including a Diameter topology hiding module (THM):

receiving, from a first Diameter node in a first service provider network, a first Diameter signaling message including Diameter topology information;

determining that a trust relationship between the first service provider network and a second service provider network to which the first Diameter signaling message is addressed requires at least some level of topology hiding;

in response to determining that the trust relationship requires at least some level of topology hiding, determining a topology hiding type based on the first Diameter signaling message; and modifying, based on the topology hiding type, the Diameter topology information included in the first Diameter signaling message to hide at least some of the Diameter topology information, wherein the Diameter agent is further configured to route Diameter messages from the first service provider network to a third service provider network, to determine that the first service provider network identifies the third service provider network as a trusted network, and to refrain from performing Diameter topology hiding for the Diameter messages routed from the first service provider network to the third service provider network.

12. The method of claim 11 further comprising routing, via a routing module, the modified first Diameter signaling message to a second Diameter node in the second service provider network.

13. The method of claim 12 further comprising identifying an origin node type of the first Diameter node and a destination node type of the second Diameter node.

14. The method of claim 12 further comprising receiving, from the second Diameter node in the second service provider network, a second Diameter signaling message including the modified Diameter topology information, replacing the modified Diameter information in the second Diameter signaling message with the Diameter topology information for the first Diameter node, and forwarding the second Diameter signaling message including the Diameter topology information for the first Diameter node to the first Diameter node.

15. The method of claim 11 further comprising modifying the Diameter topology information included in the first Diameter signaling message by replacing the at least some Diameter topology information with pseudo information.

16. The method of claim 11 wherein the Diameter topology information contained in attribute-value pair (AVP) parameter values in the first Diameter signaling message includes at least one of: an origin-host parameter value, an origin-realm parameter value, a destination-host parameter value, a destination-realm parameter value, and a route-record parameter value.

17. The method of claim 16 wherein the modified Diameter topology information comprises at least a pseudo origin-host parameter value.

18. The method of claim 17 further comprising selecting the pseudo origin-host parameter value using a hash function.

19. The method of claim 11 further comprising communicating Diameter signaling messages in both a session-less and a session based environment.

20. A non-transitory computer readable medium having stored thereon executable instructions that when executed by a processor of a computer control the computer to perform steps comprising:

at a Diameter agent including a Diameter topology hiding module (THM):
  receiving, from a first Diameter node in a first service provider network, a first Diameter signaling message including Diameter topology information;
  determining that a trust relationship between the first service provider network and a second service provider network to which the first Diameter signaling message is addressed requires at least some level of Diameter topology hiding;
  in response to determining that the trust relationship requires at least some level of topology hiding, determining a topology hiding type based on the first Diameter signaling message; and
modifying, based on the topology hiding type, the Diameter topology information included in the first Diameter signaling message to hide at least some of the Diameter topology information; wherein the Diameter agent is further configured to route Diameter messages from the first service provider network to a third service provider network, to determine that the first service provider network identifies the third service provider network as a trusted network, and to refrain from performing Diameter topology hiding for the Diameter messages routed from the first service provider network to the third service provider network.

* * * * *

UNITED STATES PATENT AND TRADEMARK OFFICE
CERTIFICATE OF CORRECTION

| | | |
|---|---|---|
| PATENT NO. | : 9,967,148 B2 | Page 1 of 1 |
| APPLICATION NO. | : 14/795601 | |
| DATED | : May 8, 2018 | |
| INVENTOR(S) | : Goyal et al. | |

It is certified that error appears in the above-identified patent and that said Letters Patent is hereby corrected as shown below:

In the Drawings

Drawing sheet 4 of 7, in FIG. 4A, Line 1, delete "INITIATIOR" and insert -- INITIATOR --, therefor.

Drawing sheet 4 of 7, in FIG. 4B, Line 1, delete "INITIATIOR" and insert -- INITIATOR --, therefor.

Signed and Sealed this
Thirtieth Day of October, 2018

Andrei Iancu
*Director of the United States Patent and Trademark Office*